United States Patent [19]
Barnes

[11] 3,883,182
[45] May 13, 1975

[54] SIDEWALL TRIM MEMBERS

[76] Inventor: J. Haywood Barnes, 283 Tolbert St., Wadsworth, Ohio 44281

[22] Filed: Mar. 21, 1973

[21] Appl. No.: 343,434

[52] U.S. Cl. ............................................ 301/37 TC
[51] Int. Cl. ................................................ B60b 7/00
[58] Field of Search..... 301/37 ST, 37 TC; 152/353, 152/362 R, 374, 357 R, 357 A

[56] References Cited
UNITED STATES PATENTS

| | | |
|---|---|---|
| 2,757,701 | 8/1956 | Henson ........................... 152/362 R |
| 2,963,326 | 12/1960 | Wood .............................. 301/37 ST |
| 3,044,834 | 7/1962 | Shoemaker ..................... 301/37 TC |
| 3,048,446 | 8/1962 | Shoemaker ..................... 301/37 TC |
| 3,192,984 | 7/1965 | Bourdon ......................... 152/357 A |
| 3,232,331 | 2/1966 | Cappa et al ......................... 152/374 |

Primary Examiner—M. Henson Wood, Jr.
Assistant Examiner—Robert Saifer
Attorney, Agent, or Firm—Oldham & Oldham Co.

[57] ABSTRACT

A trim member for the sidewall of a tire and having a substantially inextensible radially inner section. A reenforcing member is present in such inner section or else it is made from a relatively hard elastomer.

8 Claims, 9 Drawing Figures

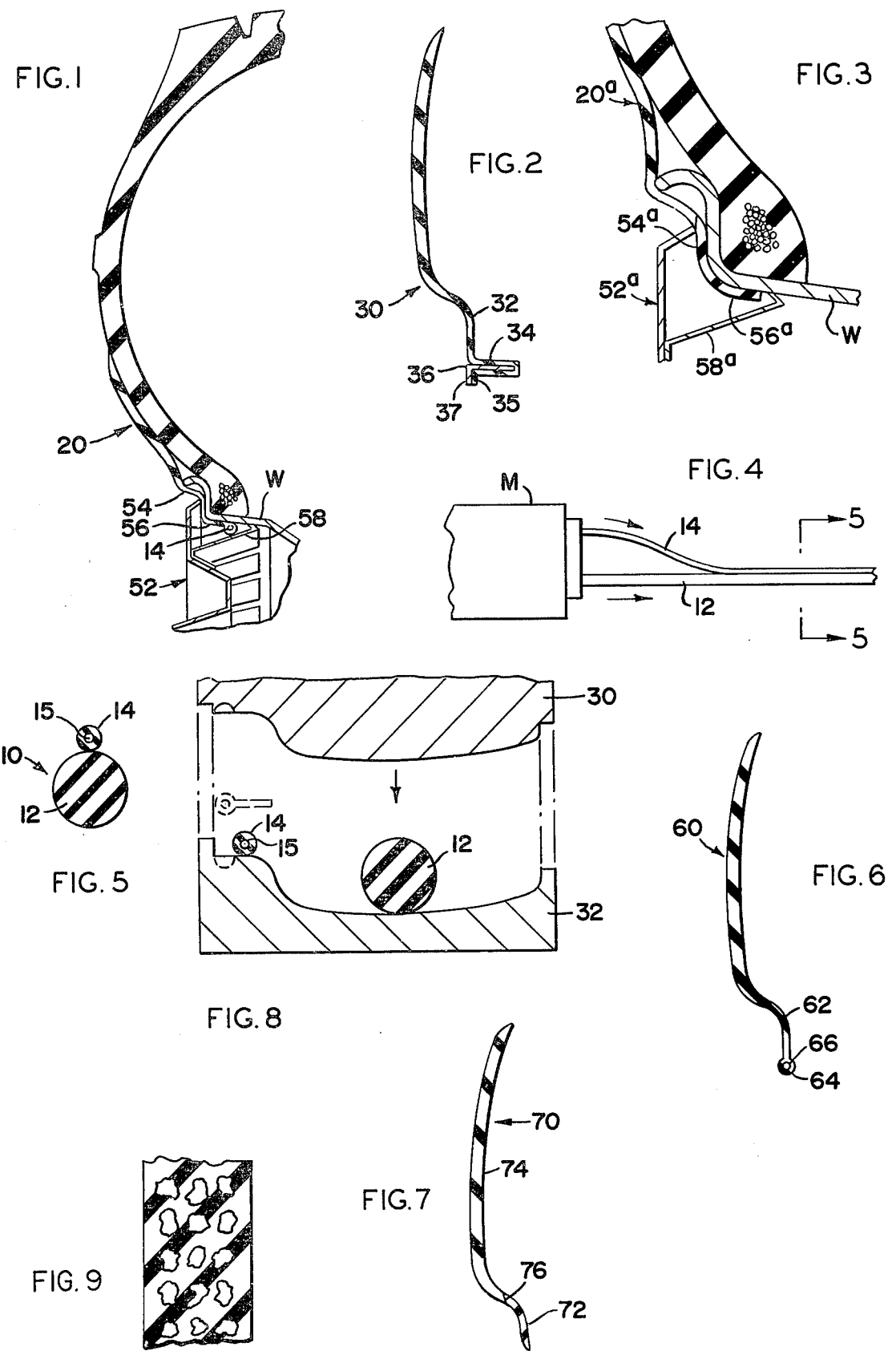

SIDEWALL TRIM MEMBERS

This invention relates to removable trim members for a pneumatic tire and wheel assembly. Especially, it relates to constructions of the general type as shown in prior U.S. Pat. Nos. 2,915,335 and 2,737,422.

BACKGROUND OF INVENTION

Heretofore there have been many different types of removable trim members provided for a pneumatic tire and wheel combination. A large number of such resilient trim members have been made and sold heretofore. The trim members normally are secured to the tire and rim combination by being welded between the bead of the tire and the accompanying flange on the wheel. However, in service, when the tire is operated at high speed, there have been difficulties encountered in retaining the trim members in operative engagement with the tire and wheel combination. As a result of the use of prior constructions, the trim members have been thrown from the wheels with sufficient frequency as to reduce the commercial appeal of the items.

One idea that has been proposed heretofore is to secure the trim member to the tire and wheel assembly by the removable metal cover provided on the wheel assembly, but again, this has not provided a satisfacotry trim member anchoring action.

The general object of the present invention is to provide a novel and improved tire trim member particularly adapted to be frictionally secured to the combination assembly of a tire, a wheel and a wheel cover and wherein the trim member is characterized by being non-expandible.

A further object of the invention is to provide a special composition in an anchor section at the radially inner margin of a resilient tire trim member to prevent growth or circumferential expansion of the trim member when in operative service under abuse and high speed conditions.

Yet another object of the invention is to form a tire trim member from two separate elastomer compositions with one forming a radially inner section of the trim member and having non-expandible properties as by means therein such as reenforcing wires, cords, strands or equivalent members extending around the circumference of the anchor section to form at least one convolution of reenforcing means therein.

Another object of the invention is to compound and provide an anchor section of a tire trim member at the radially inner portion thereof whereby a firmer or less flexible elastomer is used at such area to render the anchor portion of the trim member non-expandible.

The foregoing and other objects and advantages of the invention will be made more apparent as the specification proceeds.

Reference now is made to the accompanying drawings, wherein:

FIG. 1 is a vertical section of a trim member secured in position by a removable wheel cover;

FIG. 2 is a vertical section through a modified trim member;

FIG. 3 is an enlarged fragmentary vertical section through another modified trim member of the invention;

FIG. 4 is an elevation of an extrusion means used to form strips used in forming trim members of the invention;

FIG. 5 is a cross section of one type of an extruded strip used in forming a trim member embodying the principles of the invention;

FIG. 6 is a section of another type of a trim member of the invention which is adapted to be secured to a tire and wheel combination by being compressed against the wheel flange by the tire bead;

FIG. 7 is a fragmentary vertical section of another trim member of the invention;

FIG. 8 is a somewhat diagrammatic view indicating how the extruded strips of FIG. 4 or 5 of the drawings can be positioned in a vulcanization mold for final formation of the trim strip of the invention and FIG. 9 is an enlarged fragmentary section of a radially inner skirt portion of a trim member in a modified embodiment thereof.

When referring to corresponding members shown in the drawings and referred to in the specification, corresponding numerals are used to facilitate comparison therebetween.

Attention now is particularly directed to FIG. 5 of the drawings, and in this figure a vertical section of an extruded strip 10 is shown. The strip 10 includes a primary body, normally cylindrical, indicated at 12, and a smaller section or portion usually cylindrical indicated at 14. This smaller section 14 preferably is weakly attached to the larger section 12 by peripheral portions of the two sections that abut and engage.

The sections 12 and 14 both are elastomer compositions with the section 12 being formed from butyl rubber and other known rubbers and compounding ingredients so as to provide a resilient trim member 20, FIG. 1, by vulcanization of the strip 10. The section 14 has, as one important element thereof, at least one strand, filament or other member 15 that is formed from nylon cord, a spring steel wire, a woven wire cable, or other member which is substantially or completely non-expandible when embedded in a vulcanized end product, i.e. the trim member 20.

Conventional extrusion means M are available by which the sections 12 and 14 can be separately formed and they can normally be extruded from a common die means, or the two members could be separately extruded and then be pressed together lightly at their peripheral areas to provide the structure of FIG. 5. Preferably directly after the extrusion action, the elastomer compositions can be cooled as by passing through a cooling bath to prevent any premature vulcanization thereof.

FIG. 8 shows the provision of a pair of mold members 30 and 32 that are adapted to cooperate to form a trim member like the trim member 20 shown in FIG. 1. The sections 12 and 14 preferably are separated after they are cut to length to overlap annularly in the mold sections. Then they can be separated as positioned in the mold.

The structure shown in FIGS. 1 and 3 for the trim member 20 is of the type that is adapted to be secured to a tire and wheel assembly by a removable wheel cover 52 and consequently the member has been extended both radially and axially inwardly in relation to prior trim members as in U.S. Pat. No. 2,737,422. This trim member 20 has an anchor strip or section 54 provided at its radially inner edge and wherein such anchor section terminates in an axially inwardly extending section indicated at 56. This radially inner edge, skirt, or section 54 can be of any suitable thickness but it must be relatively thin as it is confined in the relatively small area or space that exists between portions of the wheel cover and the wheel. The section 54 terminates short of the conventional spring fingers 58 that secure the cover to the wheel. Hence the inner skirt is formed from a tough elastomer compound which strengthens the anchor portion of the trim member. It is aided and reenforced by the one or more reenforcing members 15 therein.

Obviously, when the strips shown in FIGS. 5 and 8 of the drawings are formed, they are of continuous length and then prior to being positioned in a mold means, they are cut to proper lengths so that the ends of the extruded strips as placed in the mold will overlap slightly. During the cure of these trim members, the elastomer becomes relatively fluid and the starting materials takes the end product shape readily under the vulcanization conditions. However, at the same time, the reenforcing members provided in the radially inner portions of the trim members will substantially maintain their positions and forms a bead at the edge of the skirt. The reenforcing members may have some contraction when the trim member is taken from the mold and cooled, but the main body of the elastomer in which they are embedded can have some slight movement with relation to these reenforcing members during cooling. In all events, the reenforcing members will not expand during service. Hence, when operatively positioned on a wheel unit and operated at high speeds, the circumferentially directed forces tending to throw or expand the trim member will not produce any actual expansion of the radially inner section of the trim member. The trim member will remain in operative position and give a good service life. Furthermore the shaping of the anchor strips 54 facilitates its engagement with the wheel and wheel cover.

It is possible to strengthen or harden the anchor section 54 and especially the portion 56 in other manners. For example, the portion or section 14 from which the radially inner skirt portion 56 of the trim member is made can be provided with a relatively large quantity of plastic particles or pellets therein. For example, high impact styrene, or crystal styrene can be compounded with the elastomer as a special ingredient therein and this plastic material, which is compatable with butyl rubber and other elastomers, but which has a relatively high melting point, will serve to reenforce the elastomer and prevent expansion thereof when in vulcanized form. Particles of plastic are indicated at 57 in a radially inner skirt portion of a trim member of the invention. The plastic can be present in the elastomer approximately from about 40 up to about 60 percent of the compound whereby the elastomer present would vary inversely from about 60 down to about 40 or 30 parts per hundred of the compound. Minor amounts of conventional filler ingredients, curing ingredients and the like also are present in the composition. The plastic used can be mixed with the elastomer and be extruded therewith and they will remain in the localized area of the trim member during vulcanization to provide a reenforcing and hardening action for the radially inner, or anchor portion of this trim member.

FIG. 2 of the drawings shows a modified trim member 30, similar to the trim member shown in FIG. 1, but in this instance, the radially inwardly extending skirt 32 has an end portion thereon of substantially U-shape and indicated at 34. This skirt is adapted to receive an anchor ring 36 therein with both the skirt 34 being adapted to be positioned against the radially inner surface of a wheel W as shown in FIG. 1, but with the members 34 and 36 replacing the portion 56 of the trim member as shown. Some slight area of between ⅛ to 3/16 inches in radial depth is provided between the spring fingers 58 and the outwardly extending sharp end provided on such finger 58 for engaging with the inner periphery of the wheel to retain the wheel cover in engagement therewith. These members 34 and 36 both are shown with a radially inwardly extending edge portion or flange 35 and 37, respectively, provided thereon to aid in strengthening these members. The annular member 36 can be formed from plastic, thin gauge metal, or other means as desired. Obviously these flanges 35 and 37 could be eliminated from the members 34 and 36 if desired.

FIG. 3 shows a modification of the trim member 20 of FIG. 1. In lieu of the reenforcing member 15 shown in the enlarged axially inner end of this trim member, it is possible to form the skirt portion 56a of the trim member from a relatively hard elastomer or rubber. Such hard rubber can be compounded in a conventional manner so that the two extruded strips, as the members 12 and 14 shown in FIG. 6, will blend together in the mold and normally provide somewhat of an overlapped zone or area therein for bonding between the two extruded strips to form an integral unit therefrom by vulcanization. In such instance, the strip 14 can be made more of substantially rectangular shape in section, and of course, there would be no reenforcing member 15 provided therein at such time.

FIG. 6 of the drawings shows a trim member 60 of the type shown in my prior U.S. Pat. No. 2,737,422 and wherein the trim member is adapted to be held in position by being frictionally engaged between the edge flange on the wheel and the tire head. The trim member 60 shown in FIG. 6 thus is provided with a radially inner skirt portion 62 which has an enlarged bead 64 at its radially inner edge. Normally, such bead 64 has one or more reenforcing cords, strips or wires 66 provided therein to provide an enlarged area at the axially and radially inner portion of the trim member to aid in providing a non-expandable frictional engagement between an inflated tire positioned on a wheel assembly and the trim member 60.

FIG. 7 of the drawings is of interest as it shows a trim member 70, like the member 60, but wherein a radially outer portion of the trim member is formed from a resilient elastomer composition of a conventional nature, but the axially and radially inner skirt 72 is formed from a relatively rigid or hard rubber, Such rubber 72 may be of the composition as referred to hereinbefore for providing a substantially rigid member that is integrally bonded to a resilient radially outer portion of the same member.

The substantially hard or rigid inner section of skirt 72 can be made from a hard rubber composition while the radially outer portion 74 can be of a conventional resilient composition.

The relatively hard rubber radially inner section of the trim member could have from about 20 to 50 percent sulfur therein and not have any accelerator provided in such a composition whereas a conventional rubber composition for the outer section would be compounded for a slower curing action with just the accelerator and no sulfur in it. Hence, the two compositions could be cured by a unitary curing time and temperature. Other conventional compositions can be used to form the trim member 70 and obtain a unitary structure during vulcanization as the soft and harder rubber mixes will blend together as at a joinder line 76 during the cure action.

A hard rubber composition as disclosed can be used to make the skirt 56a as shown in FIG. 3. Also, the skirt 56 of FIG. 1 can be made from conventionally compounded elastomer the same as used for the radially outer portion of the trim member.

It is possible by the invention to reinforce a radially inner portion of the trim rings to prevent expansion thereof. The present invention provides a novel and improved structure wherein the radially inner portion of the trim member will not expand. Also, the trim member can be retained in engagement with the wheel by the wheel cover physically holding an enlarged radially inner edge portion of the trim ring in engagement with the wheel, or at least aiding in retaining the trim ring in place. Or the tire bead, pressing on an enlarged bead reenforcing edge of the trim ring, will aid in retaining the member in operative position.

The trim members are molded to contours to aid in retaining outer portions thereof in resilient engagement with a tire side wall.

The reenforcing means used in the trim members may be reenforcing cords or the like, or it may be reenforcing compounding ingredients present in localized areas of the trim ring.

While several complete embodiments of the invention have been disclosed herein, it will be appreciated that modification of these particular embodiments of the invention may be resorted to without departing from the scope of the invention.

What is claimed is:

1. An annular sidewall trim member for a pneumatic tire comprising a resilient outer section for engaging part of a tire sidewall, and a radially inner annular anchor section, both of said sections being formed from elastomer but with said anchor section having reenforcing means therein to prevent radial expansion thereof, said trim member being adapted to engage a tire and wheel combination to be secured thereto by said anchor section and by a wheel covering engaging the wheel, said anchor section being thinner than said outer section and having a portion of smaller diameter than the tire bead engaging portion of a rim with which the trim member is to be used, said anchor section extending radially beyond the wheel cover when the member and cover are operatively positioned on a wheel.

2. A sidewall trim member as in claim 1 where said anchor section has as the major ingredient therein, particles of a plastic material blended therein, which plastic material is compatible with the elastomer and is distributed therethrough.

3. A sidewall trim member as in claim 1 where said reenforcing means comprising compounding ingredients forming a relatively hard section extending around the circumference of the trim member.

4. In combination, a vehicle wheel having a rim area with a terminal rim flange and a substantially axially extending tire bead engaging section that has a radially inner surface, a tire mounted on the rim area, a wheel cover having a radially outer section and generally axially extending spring fingers engaging the radially inner surface of such rim area, and a tire trim means secured to the combination by said wheel cover, said tire trim means having a relatively thin radially inner section thereon, reenforcing means in a radially inner portion of said anchor section to prevent expansion of the trim means in use, said anchor section normally being held against said rim area by said wheel cover with said reenforcing means being adjacent the radially inner wall of said tire bead engaging section.

5. A sidewall trim member as in claim 4 wherein said reenforcing means comprising compounding ingredients forming a relatively hard section extending around the circumference of the trim member.

6. A tire trim means as in claim 4 where said anchor section reenforcing means comprise a reenforcing cord extending around the circumference of the trim means and being of a smaller diameter than said tire bead engaging section of the wheel.

7. A tire trim means as in claim 6 where said reenforcing cord is embedded in an enlarged bead formed at the radially inner end of the trim means, said bead being positioned intermediate said wheel cover outer section and the inner ends of said spring fingers.

8. A sidewall trim member as in claim 1 where said anchor section end portion is enlarged at its free end and has said reenforcing means therein and positioned radially within the tire bead engaging portion of the wheel.

* * * * *